Patented Apr. 19, 1932

1,854,930

UNITED STATES PATENT OFFICE

CHARLES N. FREY AND ELMER B. BROWN, OF NEW YORK, AND COLGATE CRAIG, OF PEEKSKILL, NEW YORK, ASSIGNORS, BY MESNE ASSIGNMENTS, TO STANDARD BRANDS INCORPORATED, OF DOVER, DELAWARE, A CORPORATION OF DELAWARE

FOOD PRODUCT

No Drawing. Application filed November 28, 1928. Serial No. 322,580.

This invention relates to food products, and more particularly, to food products prepared by the acid hydrolysis of protein substances, such as yeast and the like, and has as a general object the production of food products of improved quality in a convenient and economical manner.

A more particular object is so to treat protein substances, such as compressed yeast and the like, as to produce a food product of excellent flavor and keeping qualities while retaining and improving the dietetic and therapeutic properties thereof.

Other objects of the invention will in part be obvious and will in part appear hereinafter.

The invention accordingly comprises a product possessing the features, properties and the relation of components which will be exemplified in the product hereinafter described, and the scope of the application of which will be indicated in the claims.

The hydrolysis of protein products with acids in order to improve their assimilability by the human organism has long been known. As heretofore practiced, however, such hydrolytic processes have resulted in a lowering of the therapeutic value of the resulting product and have been otherwise generally inefficient, in that discoloration and the development of the bitter principles have been marked. In accordance with the present invention, the hydrolytic treatment of the protein substance is so carried out that the resultant product contains all of the original constituents in a more digestible and assimilable form as regards the food value thereof, and, at the same time, is substantially free from products causing discloration or giving a bitter taste. This mild hydrolysis does not destroy vitamin B to any great extent, as shown by appropriate tests on animals. If strong acids alone are used, rapid destruction occurs.

In accomplishing this desirable result a protein substance, such as, for example, compressed yeast—preferably, bakers' yeast—is treated with a mixture of a non-toxic mineral acid, such as a mineral acid belonging to the group consisting of hydrochloric, phosphoric and the like, and a non-toxic organic acid, such as an organic acid belonging to the group consisting of lactic acid glutamic acid, citric acid and the like, until the desired hydrolysis is effected, just prior to the commencement of formation of the bitter principles whereby a product high in food and therapeutic value, light color and excellent keeping qualities and a pleasant taste results. This product also filters readily and can thereby be manufactured commercially, and the yield of material based on original protein substance or yeast is high.

As a specific example of the manner in which the process may be carried out, the following is given: To about 4 lbs. of compressed yeast there is added 35 cc. of hydrochloric acid (sp. gr. 1.19) and 23 cc. of lactic acid. The mixture is then autoclaved at about 15 to 20 lbs. pressure for about 4 hours.

The extract is thereafter separated and the residue of the hydrolyzed mass is evaporated to a pasty consistency, which is usual in such products and which has a specific gravity of about 1.4. During, or prior to the evaporation, such of the acidity as may be desired is neutralized with soda,—a favorable final acidity being approximately neutral to litmus. Also if desired, during the evaporation other suitable flavoring agents may be added, as, for example, salt, celery salt or other vegetable extract, glycerine and the like. A more specific example of flavoring agents which may be added for desirable results is as follows: celery salt—.5–1 lb. to 225 lbs. hydrolyzed yeast, onion juice—225 cc. to 225 lbs., 2% glycerine or 4.5 lbs. to 225 lbs. on finished product. Hard fat, butter, cheese, sugar, gelatin, carrots, tomatoes, meat extracts, malt flour, etc., may also be used.

If a powdered product is desired, take to dryness by means of vacuum drum dryer. The flavoring materials may be incorporated either before or after drying.

Although yeast has been mentioned in the above specific example, it is to be understood that other suitable protein-containing agents may be used in place thereof; such as, for example, animal proteins, such as are found in casein, and vegetables proteins, as in the case of gluten and soy bean.

The product produced by the present process, in addition to its use as a food product and in flavoring soups and the like, is also particularly adapted for use in bread and cracker making, and when so used is found to produce a highly desirable increase in food value and in crust coloration.

Since certain changes may be made in the above product, and different embodiments of the invention could be made, without departing from the scope thereof, it is intended that all matter contained in the above description shall be interpreted as illustrative and not in a limiting sense. It is also intended that in the claims when the terms "inorganic acid" and "organic acid" are used, such terms are intended to include respectively inorganic acids which, like hydrochloric acid, and organic acids which, like lactic acid, are non-toxic are of sufficient strength to hydrolyze the protein substance treated, and will not decompose during the hydrolyzing operation.

Having described our invention, what we claim as new and desire to secure by Letters Patent is:

1. A process of treating protein substances, which includes admixing therewith a mixture of an inorganic acid, belonging to the group consisting of hydrochloric acid and phosphoric acid and an organic acid, belonging to the group consisting of lactic acid, glutamic acid and citric acid, hydrolyzing the mass by heat, removing the residue from the hydrolyzed mass and evaporating the extract.

2. A process of treating protein substances, which includes admixing therewith a mixture of an inorganic acid, belonging to the group consisting of hydrochloric acid and phosphoric acid, and an organic acid, belonging to the group consisting of lactic acid, glutamic acid and citric acid, hydrolyzing the mass by heating under pressure, removing the residue from the hydrolyzed mass and evaporating the extract.

3. A process of treating protein substances, which includes admixing therewith a mixture of hydrochloric and lactic acids, hydrolyzing the mass by heat, removing the residue from the hydrolyzed mass and evaporating the extract.

4. A process of treating protein substances, which includes admixing therewith a three-to-one mixture of hydrochloric and lactic acids, hydrolyzing the mass by heat, removing the residue from the hydrolyzed mass and evaporating the extract.

5. A process of preparing a food product, which comprises hydrolyzing compressed yeast by heating with a mixture of hydrochloric and lactic acids, the respective ingredients being present approximately in the proportion of 4 lbs. of yeast to 35 cc. of hydrochloric acid (sp. gr. 1.19) and 23 cc. of lactic acid (85%); hydrolyzing the mass, separating the residue from the hydrolyzed mass and evaporating the extract.

6. As a new composition of matter, a food product prepared by admixing compressed yeast with a mixture of an inorganic acid, belonging to the group consisting of hydrochloric acid and phosphoric acid, and an organic acid, belonging to the group consisting of lactic acid, glutamic acid and citric acid, hydrolyzing the mass by heat, removing the residue from the hydrolyzed mass and evaporating the extract; the excess of the acids being neutralized prior to completion of the evaporation.

7. As a new composition of matter, a food product prepared by heating compressed yeast with a mixture of hydrochloric and lactic acid, the respective ingredients being present approximately in the proportion of 4 lbs. of yeast to 35 cc. of hydrochloric acid (sp. gr. 1.19) and 23 cc. of lactic acid (85%); hydrolyzing the mass, separating the residue from the hydrolyzed mass and evaporating; the excess of the acids being neutralized prior to completion of the evaporation.

In testimony whereof we affix our signatures.

CHARLES N. FREY.
ELMER B. BROWN.
COLGATE CRAIG.